F. H. PIAGET.
WINDOW PLANT-BOX.
No. 187,771. Patented Feb. 27, 1877.
Fig. 1.
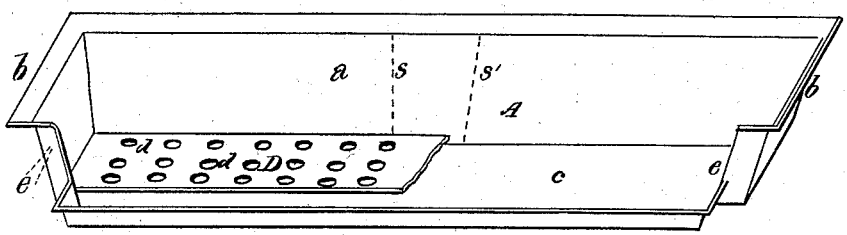
Fig. 2.
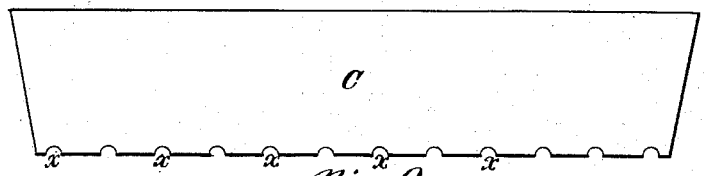
Fig. 3.
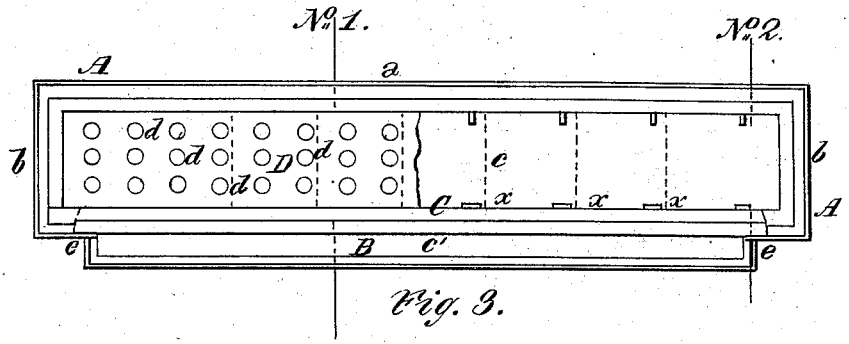
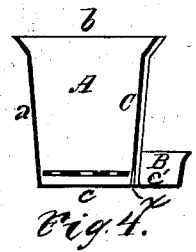
Fig. 4.
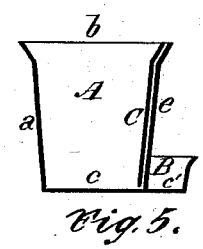
Fig. 5.
Witnesses
Lewis T. Newell
William F. Selkirk
Francis H. Piaget
by his Attorney
Alex. Selkirk
Inventor.

UNITED STATES PATENT OFFICE.

FRANCIS H. PIAGET, OF ALBANY, NEW YORK.

IMPROVEMENT IN WINDOW-PLANT BOXES.

Specification forming part of Letters Patent No. 187,771, dated February 27, 1877; application filed December 12, 1876.

*To all whom it may concern:*

Be it known that I, FRANCIS H. PIAGET, of the city and county of Albany, State of New York, have invented certain Improvements in Window-Plant Boxes; and I do hereby declare that the following is a description thereof, reference being had to the accompanying drawings, forming a part of this specification, in which—

Figure 1 represents a perspective view of the main portion of the box with removable side removed. Fig. 2 is a perspective view of the movable side of the box. Fig. 3 is a plan view of the box. Fig. 4 is a cross-sectional view at line No. 1 in Fig. 3. Fig. 5 is a cross-sectional view at line No. 2 in Fig. 3.

My invention relates to plant-boxes for windows; and consists of the combinations of devices or elements hereinafter described.

The object of this invention is to render the box adapted to receive and hold soil for growing plants in such a manner that by the removal of one of its sides the said soil may be cut in pieces, so that the several plants growing in the same may be removed, with a portion of the soil, without disturbing their roots; also, that plants having roots seeking water may be permitted to reach water as they may require; also, that water may be supplied to the soil by capillary attraction from a reservoir.

To enable others skilled in the art to make and use my invention, I will proceed to describe the same in reference to the drawings and the letters of reference marked thereon, the same letters indicating like parts.

In the drawings, A represents the plant-box, and consists of the fixed or permanent side $a$, ends $b\ b$, made continuous or solid with said permanent side, as shown in Fig. 1, and the bottom $c$, also made continuous or solid with side and ends. Made also connected or solid with the said permanent side and ends of the said box is the water-reservoir B, having its bottom $c'$ made continuous with bottom $c$ of the box proper, and on the same plane as shown in Figs. 1 and 4. C is a removable and attachable side piece, intended to form the side of the box opposite to the side $a$, as shown in Figs. 3, 4, and 5. The said removable side receives its support against flanges $e\ e$, Fig. 3, from the ends of the same, as shown, and may be temporarily secured in place by screws or buttons, or their well-known mechanical equivalents, if desired, though I prefer to dispense with said means for fastening said removable side as the outward pressure of the soil within the box will be in most cases capable of holding the said side in place. The removable side C is, preferably, adjacent to the water-reservoir B, for convenience of construction of the said box as a whole, especially when cast or molded. Made in the lower edge of the side adjacent to the water-reservoir are a series of ports, $x\ x$, which communicate from said reservoir to the interior of the box, so as to permit the flow of water from said reservoir to the said box. D is a perforated bottom, standing or supported at a short distance above the bottom $c$ of the box proper.

The perforations $d\ d$ may be made in any form that will be capable of permitting the roots of water-seeking plants to enter, and also permit of the passage of vapor from the space between the close bottom $c$ and the perforated bottom D upward to the soil above.

If desired, the bottom D may be made of wide mesh-wire.

When the box is to be used for growing plants, the removable side C is to be put in place to make the box complete for holding soil.

The soil may be fed with water from its top surface, or from the reservoir beneath.

Where lilies or other water-plants are intended to be grown with plants not seekers of water, the bottom D may be made to occupy only a portion of the length of the box.

When it is desired to remove the plants from box to the natural soil, or to some other box or pot, the soil in this improved box with its growing plants may be readily separated by cutting vertically through the same from top to bottom, after the removable side D has been removed, commencing about central with the mass of the soil, as shown by dotted lines $s\ s'$ in Figs. 1 and 3, and separating the mass in a wedge-shape form, as illustrated by said dotted lines in Fig. 1. The other portions of the soil may then be cut in either a true vertical plane, or slightly inclined, when the several portions may be readily removed.

It may be readily seen that by my improvements in this invention any one or more of the several plants in the box may be readily removed without disturbing the plants desired to remain, which cannot be easily done in those window-boxes having sides and ends made fixed and permanent; and also that the removed plants may be replaced by others of a different kind or variety when a change is desired. The plants may be changed in their situations in relation to each other as they are developed, in order to secure an artistic effect by causing a plant of one variety or species to contrast with another in foliage, blossom, or extension, or in all of these, for a pleasing effect, which cannot be had with window-plant boxes heretofore made with a certainty that the plants removed or changed would not be injured. It may also be seen that plants seeking water by their roots may be grown with plants requiring only moist soil, which cannot be done with those window-plant boxes not provided with a perforated false bottom and a water-reservoir.

I am aware that plant-boxes have been used having their several sides so connected with the bottom as to be capable of being turned down to uncover all the sides of the mass of soil therein. Such boxes I do not claim, as they show a different means, requiring a different operation, and are for a different purpose, and not intended to hold several plants requiring change of situation from time to time for producing an artistic display, or arrangement of plants for parlor or sitting-room adornment.

I am also aware that plant-pots have been made with a chamber at the bottom for holding water, the central portions of which chamber was above the outer periphery of the same, with horizontal perforations communicating with the soil-space surrounding the said more central chamber elevation. Such chamber I do not claim. Neither do I claim the horizontal perforations leading from such chamber to the soil-space surrounding the same, as such an arrangement and use of those parts would defeat the objects of my invention. Neither do I claim a cup or outer reservoir leading to the chamber below a false bottom, broadly, for such cups have been used by others.

Having described my invention, what I claim, and desire to secure by Letters Patent, is—

In combination with a window-plant box, A, having one of its sides removable, and adapted to hold a variety of plants, the bottom D, provided with vertical perforations, and supported above the bottom c, and the water-reservoir B, having ports communicating to the chamber between the said two bottoms, in the manner and for the purpose set forth.

FRANCIS H. PIAGET.

Witnesses:
  LEWIS T. NEWELL,
  WM. F. SELKIRK.